United States Patent
Gahleitner et al.

(10) Patent No.: US 8,063,148 B2
(45) Date of Patent: Nov. 22, 2011

(54) ANTIBLOCKING AGENT USING CROSSLINKABLE SILICON-CONTAINING POLYOLEFIN

(75) Inventors: Markus Gahleitner, Neuhofen/Krems (AT); Tung Pham, Linz (AT); Johannes Wolfschwenger, Niederneukirchen (AT); Doris Machl, Linz (AT)

(73) Assignee: Borealis Technology Oy, Porvoo (FI)

( * ) Notice: Subject to any disclaimer, the term of this patent is extended or adjusted under 35 U.S.C. 154(b) by 162 days.

(21) Appl. No.: 12/521,445

(22) PCT Filed: Nov. 7, 2007

(86) PCT No.: PCT/EP2007/009653
§ 371 (c)(1),
(2), (4) Date: Aug. 7, 2009

(87) PCT Pub. No.: WO2008/080446
PCT Pub. Date: Jul. 10, 2008

(65) Prior Publication Data
US 2010/0331490 A1    Dec. 30, 2010

(30) Foreign Application Priority Data
Dec. 29, 2006    (EP) .................................... 06027119

(51) Int. Cl.
C08J 5/18    (2006.01)
C08K 5/54    (2006.01)
C08L 23/04   (2006.01)
C08L 23/10   (2006.01)
C08L 23/16   (2006.01)

(52) U.S. Cl. ......... 525/191; 525/197; 525/209; 525/240

(58) Field of Classification Search ................. 525/191, 525/197, 209, 240
See application file for complete search history.

(56) References Cited

U.S. PATENT DOCUMENTS

| 6,794,453 B2 * | 9/2004 | Jackson et al. ............... 525/209 |
| 2002/0001715 A1 | 1/2002 | Redondo et al. |
| 2009/0131594 A1 * | 5/2009 | Pham et al. ................. 525/240 |
| 2010/0267900 A1 * | 10/2010 | Gahleitner et al. .......... 525/209 |

FOREIGN PATENT DOCUMENTS

| EP | 0325573 | 7/1989 |
| EP | 0890612 | 1/1999 |
| EP | 1695997 | 8/2006 |

OTHER PUBLICATIONS

International Search Report dated Jan. 17, 2008 for PCT/EP2007/009653.
International Preliminary Examination Report dated Mar. 24, 2009 for PCT/EP2007/009653.
Written Opinion for PCT/EP2007/009653.

* cited by examiner

*Primary Examiner* — Nathan M Nutter
(74) *Attorney, Agent, or Firm* — Milbank, Tweed, Hadley & McCloy

(57) ABSTRACT

The present invention relates to a polyolefin composition comprising an olefin homo- or copolymer (A) in an amount of 90 wt. % or more, and an olefin homo- or copolymer (B) comprising hydrolysable silicon-containing groups, wherein olefin homo- or copolymer (B) is present in the composition in an amount of from 0.01 to 2 wt. %.

16 Claims, No Drawings

ANTIBLOCKING AGENT USING CROSSLINKABLE SILICON-CONTAINING POLYOLEFIN

This application is based on International Application PCT/EP2007/009653 filed Nov. 7, 2007, which claims priority to European Patent Application No. 06027119.4, filed on Dec. 29, 2006, the disclosures of which are incorporated by reference herein in their entireties.

The present invention relates to a polyolefin composition showing, improved antiblocking activity, scratch resistance and a low coefficient of friction. The present invention further relates to the use of a cross-linked olefin homo- or copolymer as an antiblocking agent in polyolefin compositions as well as to films comprising the olefin homo- or copolymer or the polyolefin composition.

Antiblocking agents are used in polyolefin films to improve the slippage among individual molecules of the antiblocking agent and are essential ingredients for the post-processing conversion (cutting, folding, welding etc.) of such polyolefin films. Blocking is a common problem encountered by manufacturers of polyolefin films and coatings. Blocking is the adhesion of two adjacent layers of film. It is a problem most associated with polyethylene and polypropylene films (either blown or cast) and to a lesser extent in extrusion coated or laminated products. Blocking of adjacent film layers occurs due to the presence of van der Waals forces between the amorphous regions of the polymer. These forces increase with reduced distance between the two layers, thereby increasing blocking when two layers are pressed together (e.g. binding onto a take up roll or stacking of finished, converted films). Another possible reason for blocking is the presence of low molecular weight species (such as oligomers) which tend to migrate to the surface of the film.

The most effective method for combating these handling problems is to add an antiblocking additive. An antiblocking additive present in the resin microscopically protrudes from the film surface. This creates asperities ("little bumps") which help to minimise the film-to-film surface contact, increasing the distance between the two layers, thereby minimising blocking.

The blocking between adjacent layers results in increased friction and the addition of an antiblocking agent generally contributes to a reduction in the film-to-film coefficient of friction (COF). COF is a measure of the relative difficulty with which one surface will slide over an adjoining surface. The greater the resistance to sliding, the higher the COF value (e.g. "low-slip" or "no-slip" films, sometimes referred to as "high COF" films). Useful information on the coefficient of friction of antiblocking additives in polypropylene films is given by G. W. Schael, J. Appl. Polym. Sci. 10 (1966) 653-661 and in the respective standard description for ISO 8295.

A variety of commercially important antiblocking additives are known in the art. They can be divided into inorganic antiblocking additives such as silicas, talc, calcium carbonate, ceramic spheres, kaolin/clay, mica etc and organic antiblocking additives such as bis-amides, primary or secondary amides, organic stearates, metallic stearates, silicones, PTFE etc. Inorganic additives are preferred for high temperature applications and specifically in polyolefin extrusion applications. They are relatively inexpensive and best positioned for large volume, commodity-like applications.

One of the most commonly used inorganic antiblocking additives is silica, e.g. natural or synthetic silica. It has the additional advantage of improving the optical quality of the final products due to its very fine particulate form.

A negative side effect of such inorganic antiblocking additives such as silica or other minerals is the tendency to cause surface damage in the form of microscopic scratches on the opposite in conversion processes. Thus, the optical quality of the film deteriorates. This effect can be mitigated by e.g. changing the geometry of the particles, thus reducing tips and edges and generally obtaining spherical forms or using softer materials.

Other proposals are directed to introducing a further additive in the polyolefin composition to improve its properties. Thus, EP 691 366 proposes the addition of a small amount of a monocyclic olefin polymer to a polypropylene composition which comprises an antiblocking agent such as talc. Small amounts of the monocyclic olefin polymer improve the transparency and image clarity and bleeding during extrusion is prevented.

It should be specifically mentioned that the improvement of optical properties and simultaneously the improvement of the antiblocking activity of the above described polyolefin compositions are contradicting properties. Therefore, compositions having excellent antiblocking activity will show deteriorated optical properties such as haze and opaqueness. The deterioration of haze can be attributed to light scattering on the particles of the added antiblocking agent.

Therefore, it is an object of the present invention to overcome the above problems and to provide an improved polyolefin composition which is excellent in antiblocking activity, expressed as the coefficient of friction, improved in scratch resistance while simultaneously showing excellent optical properties such as low haze, clarity, and high gloss.

It is another object of the present invention to provide an improved antiblocking agent and its use for a polyolefin composition.

It is a further object of the present invention to provide films comprising the improved antiblocking agent or the polyolefin composition.

The present invention is based on the finding that a specific crosslinked polyolefin may be used to generate an antiblocking agent of polymeric nature in a polyolefin composition.

According to a first aspect of the present invention a polyolefin composition is provided comprising:
  an olefin homo- or copolymer (A) in an amount of 90 wt. % or more, and
  an olefin homo- or copolymer (B) comprising hydrolysable silicon-containing groups,
wherein olefin homo- or copolymer (B) is present in the composition in an amount of from 0.01 to 2 wt. %.

Preferably, the above polyolefin composition comprises a silanol condensation catalyst capable of cross-linking the olefin homo- or copolymer (B) comprising hydrolysable silicon-containing groups. Thus, it is possible to create an antiblocking agent of polymeric nature dispersed in a polyolefin composition.

The hydrolysable silicon-group containing polyolefin (B) may cross-link in the presence of moisture and/or by the action of a silanol condensation catalyst. Preferably, the cross-linking reaction occurs at temperatures not higher than 30° C., more preferably at room temperature with the aid of a suitable silanol condensation catalyst. As such a silanol condensation catalyst any type capable of crosslinking the hydrolysable silicon-group containing polyolefin (A) may be used. However, it is preferred that the silanol condensation catalyst is typically selected from the group comprising Lewis acids, inorganic acids such as sulphuric acid and hydrochloric acid, and organic acids such as citric acid, stearic acid, acetic acid, sulfonic acid and alkanoic acids as dodecanoic acid, organic bases, carboxylic acids and organometallic compounds including organic titanates and complexes or carboxylates of lead, cobalt, iron, nickel, zinc and tin or a precursor of any of the compounds mentioned.

Further preferred, the aromatic organic sulfonic acid comprises the structural element:

$$Ar(SO_3H)_x \quad (I)$$

with Ar being an aryl group which may be substituted or non-substituted, and x being at least 1.

The organic aromatic sulfonic acid silanol condensation catalyst may comprise the structural unit according to formula (I) one or several times, e.g. two or three times. For example, two structural units according to formula (I) may be linked to each other via a bridging group such as an alkylene group.

Preferably, Ar is a aryl group which is substituted with at least one $C_4$- to $C_{30}$-hydrocarbyl group, more preferably $C_4$- to $C_{30}$-alkyl group.

Aryl group Ar preferably is a phenyl group, a naphthalene group or an aromatic group comprising three fused rings such as phenantrene and anthracene.

Preferably, in formula (II) x is 1, 2 or 3, and more preferably x is 1 or 2.

Furthermore, preferably the compound used as organic aromatic sulfonic acid silanol condensation catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulfonic acid and tetrapropyl benzene sulfonic acid.

The silanol condensation catalyst may also be precursor of the sulfonic acid compound, including all its preferred embodiments mentioned, i.e. a compound that is converted by hydrolysis to such a compound. Such a precursor is for example the acid anhydride of a sulfonic acid compound, or a sulfonic acid that has been provided with a hydrolysable protective group, as e.g. an acetyl group, which can be removed by hydrolysis.

In a second preferred embodiment, the sulfonic acid catalyst is selected from those as described in EP 1 309 631 and EP 1 309 632, namely a) a compound selected from the group of
(i) an alkylated naphthalene monosulfonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;
(ii) an arylalkyl sulfonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;
(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and b) a compound selected from the group of
(i) an alkylated aryl disulfonic acid selected from the group consisting of the structure (II):

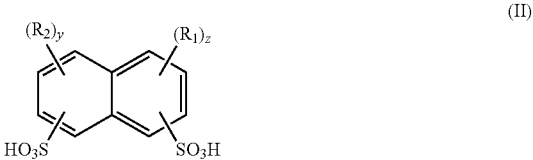

and the structure (III):

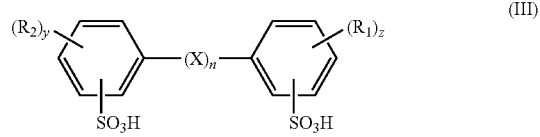

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —$C(R_3)(R_4)$—, wherein each of $R_3$ and $R_4$ is H or independently a linear or branched alkyl group of 1 to 4 carbons and n is 1; —$C(=O)$—, wherein n is 1; —S—, wherein n is 1 to 3 and —$S(O)_2$—, wherein n is 1; and (ii) a derivative of (i) selected from the group consisting of the anhydrides, esters, epoxy blocked sulfonic acid esters, acetylates, and amine salts thereof which is a hydrolysable to the alkylated aryl disulforiic acid, together with all preferred embodiments of those sulfonic acids as described in the mentioned European Patents.

Preferably, in the polyolefin composition the silanol condensation catalyst is present in an amount of 0.0001 to 1 wt %, more preferably of 0.0005 to 0.2 wt %.

In the present invention it is preferred to blend components (A) and (B) as specified above together with the silanol condensation catalyst. It is advantageous that the silanol condensation catalyst and component (A) are preferably added to the silicon group-containing polyolefin (B) by compounding a master batch, which contains the silanol condensation catalyst and the propylene homo- or copolymer (A) in a polymer matrix in concentrated with the silicon group-containing polyolefin (B).

Alternately the final composition can also be produced by blending a higher concentration than the final target concentration of (B) together with (A) and the silanol condensation catalyst, the resulting composition being further diluted with (A) to the target concentration of (B).

The polyolefin composition according to the present invention is preferably prepared by use of a masterbatch composition. According to especially preferred embodiments of the present invention the mixture for the polyolefin composition is advantageously obtained by using the following procedures (a) or (b).

(a) In a first step a high amount of component (B)—plus optionally a condensation catalyst in an amount of 2-20 wt %, preferably 5-10 wt % of the component (B) is blended with component (A) to form a masterbatch (MB). The final polyolefin composition according to the present invention may be obtained by crosslinking, preferably at ambient temperature in the presence of humidity to a crosslinking degree of at least 30% of said component (B), then mixing said masterbatch with a chemically not necessarily identical component (A)— which just has to fulfil the general requirements for (A)—in a ratio (MB)/(A) of 90:10 to 99.9:0.1 to obtain a final concentration of (B) of 0.01 to 2 wt % in the resulting mixture.

(b) An amount of 0.01 to 2 wt. % of component (B) with optionally a silanol condensation catalyst in an amount of 2-20 wt %, preferably 5-10 wt % of the component (B) is blended with component (A) in one step to form the final composition. The final polyolefin composition according to the present invention may be obtained by crosslinking, preferably at ambient temperature in the presence of humidity to a crosslinking degree of at least 30% of said component (B).

Furthermore, the blending step of the present invention can be carried out by any suitable method known in the art, but preferably in a twin screw extruder with two high intensity mixing segments and preferably at a temperature of 180 to 230° C., more preferably of 185 to 225° C., and at a throughput of 10 to 15 kg/h and a screw speed of 50 to 70 rpm.

After the compounds are blended, as described above, the melt blend is cooled in a water bath, whereby the residence time preferably is less than 120 seconds, more preferably less than 60 seconds, to solidify the blend before granulation. Alternately the granulation can be carried out directly in the water bath, in which case the residence time of the granules in the water before separation and drying preferably is less than 240 seconds, more preferably less than 120 seconds. Optionally, the resulting compound may be stored at ambient temperature of 5 to 50° C., preferably 10 to 40° C., and normal humidity. Normal humidity means in this connection a humidity of 40-85% relative.

In the present invention after the granulation of the blend, the selective cross-linking reaction follows at temperature of 5 to 50° C., more preferably of 10 to 40° C., at best ambient temperature and a humidity below 85%, more preferably below 75%, even more preferably at ambient temperature.

As the olefin homo- or copolymers (A) and (B) any olefin homo- or copolymers may be provided. However, preferably compositions such as propylene homopolymers, ethylene/propylene random copolymers or heterophasic ethylene/propylene copolymers may be used. Preferably the olefin homo- or copolymer (A) is an ethylene or propylene homo- or copolymer. Preferably, the olefin homo- or copolymer (B) is an ethylene homo- or copolymer.

The olefin polymers (A) and (B) may but need not necessarily contain the same type of olefin such as ethylene or propylene. They may also differ from each other. The olefin polymers (A) and (B) each may contain one, two or more types of olefins. The olefin homo- or copolymer (A) is contained in the polyolefin composition of the present invention in an amount of 90 wt. % or more, preferably at least 95 wt. %, more preferably at least 99 wt. %.

The hydrolysable silicon-containing groups can be introduced into the olefin homo- or copolymer (B) e.g. by grafting the silicon compound into the polyolefin or by copolymerisation of the olefin monomers and silicon-containing groups containing monomers. Such techniques are known e.g. from U.S. Pat. Nos. 4,413,066, 4,297,310, 4,351,876, 4,397,981, 4,446,283 and 4,456,704.

In the case the silicon-group containing polyolefin (B) has been obtained by copolymerisation, the copolymerisation is preferably carried out with an unsaturated silicon compound represented by the formula $$R^1SiR^2_qY_{3-q} \tag{IV}$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

Special examples of the unsaturated silicon compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silicon compound is represented by the formula $$CH_2=CHSi(OA)_3 \tag{V}$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryloxypropyltrimethoxysilane, gamma (meth)acryloxypropyltriethoxysilane, and vinyl triacetoxysilane.

The copolymerisation of the olefin and the unsaturated silicon compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivativs, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70 wt % of the copolymer, preferably about 0.5 to 35 wt %, most preferably about 1 to 30 wt %.

The grafted polyolefin (B) may be produced e.g. by any of the two methods described in U.S. Pat. Nos. 3,646,155 and 4,117,195, respectively.

The silicon groups containing polyolefin (B) according to the invention preferably comprises 0.1 to about 10 wt % of the silicon compound, more preferably 0.5 to 7 wt %, most preferably 1.0 to 4 wt % by weight, based on the total polyolefin (B).

The silanol content can be adjusted by blending the grafted or copolymerised polyolefin with a non-modified polyolefin.

If the silicon groups are introduced in the polyolefin (B) by polymerisation, as described above, it is preferred that the silicon group containing polyolefin (B) has a density of 900 to 940 kg/m³, more preferred of 910 to 935 kg/m³, most preferred of 915 to 930 kg/m³.

Furthermore, it is preferred that the silicon-groups grafted polyolefin (B) has a density of 920 to 960 kg/m³, more preferred of 925 to 955 kg/m³, most preferred of 930 to 950 kg/m³.

Moreover, the used polyolefin (B) of the invention preferably is an ethylene homo- or copolymer, as a high density polyethylene, low density polyethylene, linear low density polyethylene or the like.

Preferably, the cross-linkable polyolefin comprises, still more preferably consists of, a polyethylene containing hydrolysable silicon groups.

The hydrolysable silicon groups may be introduced into the polyolefin by copolymerisation of e.g. ethylene monomers with silicon group containing comonomers or by grafting, i.e. by chemical modification of the polymer by addition of silicon groups mostly in a radical reaction. Both techniques are well known in the art.

Moreover, the polyolefin composition according to the invention may further contain various additives, such as miscible thermoplastics, further stabilizers, lubricants, fillers, colouring agents and foaming agents, which can be added before during or after the blending step to the composition.

The polyolefin compositions according to the present invention may provide superior physico-mechanical properties to the end products containing the compositions such as films, wires or cables. Especially in film applications, the polymeric antiblocking agent used according to the present invention achieves improved antiblocking activity, low coefficient of friction between adjacent film layers together with improved scratch resistance. In addition, according to the present invention an improved optical property profile may be obtained. The films show low gloss, low haze and high clarify, giving an excellent aesthetic appearance to such products.

Especially the compositions and films according to the present invention preferably exhibit a blocking force at 90° C. after 2 h of not more than 100 N, preferably not more than 80 N, measured according to DIN 53366.

The polyolefin composition and films according to the present invention may preferably exhibit a static coefficient of friction as measured 3 days after extrusion of not more than 0.5, more preferably not more than 0.2 and a dynamic coefficient of friction of preferably not more than 1, more preferably not more than 0.5, measured according to ISO 8295 at +23° C.

The polyolefin composition and films according to the present invention may further preferably exhibit a gloss at 20° of at least 50%, more preferably at least 70%, measured according to ISO 2813 at +23° C., a haze of preferably not more than 10%, more preferably not more than 5%, measured according to ASTM D 1003 at +23° C., and a clarity of preferably at least 70%, more preferably at least 80%, measured according to ASTM D 1003.

The polyolefin composition and films according to the present invention may further preferably show a reduced tendency for generating scratches when two parts or films slide upon each other in a conversion process. Therefore, the polyolefin compositions and films of the invention also show superior scratch resistance.

According to a further aspect of the present invention films are provided comprising the above described polyolefin composition. Such films may advantageously be used for wire and cable applications or pipes.

According to a further aspect of the present invention a film is provided comprising the hydrolysable silicon-group containing olefin homo- or copolymer (B) capable of being cross-linked in the presence of moisture, in an amount of from 0.01 to 2 wt. %, preferably from 0.05 to 1 wt. %, more preferably 0.1 to 0.5 wt. %. In such a film the polyolefin (B) may provide an improved antiblocking agent of polymeric nature in the compositions of the invention in a manner as described above, preferably by using e.g. the procedures (a) or (b) above.

The use of the polyolefin (B) as an antiblocking agent provides improved antiblocking activity and low coefficient of friction. Furthermore, an improved scratch resistance and excellent optical characteristics such as low haze, high clarity and low gloss giving an aesthetic appearance to films comprising the antiblocking agent. Preferably, the antiblocking agent may be used in olefin polymer compositions in an amount of 0.01 to 2 wt. %, more preferably from 0.05 to 1 wt. %, even more preferably 0.1 to 0.5 wt. %.

Otherwise, the preferred embodiments described in detail for the inventive polyolefin composition also apply to the uses according to the present invention as an antiblocking agent.

The present invention will be described in detail below with reference to Examples and Comparative Examples. The Examples should not be understood to restrict the scope of the appended claims but merely serve to illustrate preferred embodiments of the present invention.

EXAMPLES

1. Definitions
a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg, the $MFR_5$ of polyethylene is measured at a temperature 190° C. and a load of 5 kg and the $MFR_2$ of polyethylene at a temperature 190° C. and a load of 2.16 kg.

b) Blocking Force

Blocking between layers of plastic film was measured according to DIN 53366 using a Zwick Z1.0 instrument at +90° C. By this method the film-to-film adhesion is expressed as the force in N required to separate two layers of polyolefin film. This is measured by a balance-beam type system similar to an analytical balance. One sheet of film is attached to a block suspended from the end of the balance beam. The other sheet of film is attached to a block fastened to the balance base. Weight is added equivalent to 90±10 g/min to the other side of the beam until the two films fully separate or until they reach 1.905 cm separation.

c) Coefficient of Friction

Coefficient of friction (COF) was measured according to ISO 8295 using a Series 7000 Friction Tester at +23° C. This method covers the measurement of static COF which is related to the force required to begin movement of the surfaces relative to each other and kinetic COF which is related to the force required to sustain the movement. Film-to-film values are measured by attaching a film to a stationary sled (a 200 g weight) and attaching another film to a moving plane. These two films are then pulled across each other at a specified rate (6 inches/min). The force measured (in g) is then divided by the weight of the sled to yield a dimensionless number between 0.0 and 1.0.

d) Gloss

Gloss is determined as the amount of light reflected from a surface within a given angle of 20, 60 or 85°. It was determined according to ISO 2813 at +23° C. at an angle of 20° using a Hach Lange REFO3 gloss instrument.

e) Haze

Haze is defined as the fraction of transmitted light that deviates from the incident beam by more than 2.5° and was determined according to ASTM D 1003 using a BYK-Gardner Hazegard Plus Instrumentation (BYK-Gardner, Columbia, USA).

f) Clarity

Clarity is determined by scattering in low angles and describes the degree to which fine details may be resolved in an object viewed through a film made from a given polymer composition. Clarity was determined according to ASTM D 1003 using a BYK-Gardner Hazegard Plus Instrumentation (BYK-Gardner, Columbia, USA).

2. Materials

The components—propylene homo- or copolymer, polyethylene-vinyl-silane-copolymer or grafting product and the catalyst master batch (Borealis polyethylene CAT-MB50 or CAT-MB25 with dibutyltin dilaurate as catalytically active substance), were combined in a twin screw extruder (PRISM TSE24, L/D ratio 40) with two high intensity mixing segments at temperatures between 190 and 220° C. at a through put off of 10 kg/h and a screw speed of 50 rpm. The material was extruded to two circular dies of 3 mm diameter into water base with a residence time of at least 30 sec for solidifying the melt standard, which was consequently granulated. For the period until melt processing, the resulting compound was stored at an ambient temperature of +23±2° C. and normal humidity (50±5%).

The cast films with a final thickness of 50 µm were produced on a PM30 single-screw extruder equipped with a flat film die of 20 cm width at a melt temperature of 250° C. and a chill roll temperature of 20° C.

Compounds:

All used polymers are commercially available by Borealis Polyolefine GmbH:

RD208CF is an ethylene-propylene random copolymer with MFR (230° C./2.16 kg) of 8 g/10 min, an ethylene content of 6 wt % and a density of 905 kg/m³.

FT7239 is a low density polyethylene (LDPE) with MFR (190° C./2.16 kg) of 3 g/10 min, and a density of 929 kg/m³.

Visico LE4481 is a high-pressure low density ethylene copolymer with vinyl silane content for cable insulation with MFR (190° C./2.16 kg) of 5 g/10 min, a silanol content of 1.75 wt % and a density of 927 kg/m³.

"Silica" is Gasil® AB 725, manufactured by Ineos Silicas Americas, Inc., Joliet, USA which is a conventional, synthetic amorphous silicon dioxide antiblocking agent having an average particle size of 5.3 micrometer, bulk density: 220 g/cm³, a pore volume of 1.0 mug, and a BET surface area of 400 m²/g.

Masterbatch compositions for the hydrolysable silicon group-containing olefin polymer (B) were produced as follows:

(a) 50 wt. % of the base polymer RD208CF were blended with 47.5 wt % silicon group containing polyethylene LE4481 and 2.5 wt % CAT-MB50, or (b) 75 wt. % of the base polymer RD208CF were blended with 23.75 wt % silicon group containing polyethylene LE4481 and 1.25 wt % CAT-MB25, to obtain two masterbatch compositions containing (a) 50 wt. % and (b) 25 wt % of the silicon group-containing polyethylene.

A further masterbatch composition was produced as follows:

(c) 75 wt. % of the base polymer RD208CF were blended with 25 wt. % of LDPE FT7239.

For Examples 1 and 2 0.4 wt % and 0.8 wt %, respectively of the masterbatch composition (a) were blended into RD208CF. For Example 3 0.8 wt % of the masterbatch composition (b) were blended into RD208CF.

For Comparative Example 1 0.8 wt % of masterbatch composition (c) were blended into RD208CF. For Comparative Example 2 0.2 wt % of the silica Gasil® AB 725 were blended into RD208CF.

Example 1

99.5 wt % RD208CF were blended with 0.4 wt. % of the masterbatch composition (a) and 0.1 wt % of a stabiliser mixture of 67% Tris-(2,4-di-t-butylphenyl) phosphate (Irgafos 168, CIBA Specialty Chemicals) and 33% Pentatrythrityl-tetrakis(3-(3',5'-di-tert. butyl-4-hydroxyphenyl)-propionate (Irganox 1010, CIBA Specialty Chemicals) to produce a polyolefin composition having a final content of the antiblocking agent of 0.2 wt. %

Example 2

99.1 wt % RD208CF were blended with 0.8 wt. % of the masterbatch composition (a) and 0.1 wt % of the same stabiliser mixture as in example 1 to produce a polyolefin composition having a final content of the antiblocking agent of 0.4 wt. %.

Example 3

99.1 wt % RD208CF were blended with 0.8 wt % of the masterbatch composition (b) and 0.1 wt % of the same stabiliser mixture as in example 1 to produce a polyolefin composition having a final content of the antiblocking agent of 0.2 wt. %.

Comparative Example 1

99.1 wt % RD208CF were blended with 0.8 wt. % of the masterbatch composition (c) and 0.1 wt % of the same stabiliser mixture as in example 1 to produce a polyolefin composition having no antiblocking agent and a content of the LDPE component of 0.2 wt. %.

Comparative Example 2

99.7 wt % RD208CF were blended with 0.2 wt. % of a conventional antiblocking agent for polymeric films (Silica, Gasil® AB 725) and 0.1 wt % of the same stabiliser mixture as in example 1.

The results are shown in Table 1 below.

TABLE 1

| | Antiblocking Agent (wt. %) | MFR 230° C./ 2.16 kg g/10 min | Thickness film μm | Optics Haze % | Clarity % | Gloss 20° inside % | Blocking force 90° C./2 h N | Coefficient of friction (inside/inside) | | | | | |
|---|---|---|---|---|---|---|---|---|---|---|---|---|---|
| | | | | | | | | 1 d stat. | 1 d dyn. | 3 d stat. | 3 d dyn. | 7 d stat | 7 d dyn. |
| Examples | | | | | | | | | | | | | |
| EX1 | 0.2% LE4481 (MB50) | 6.7 | 54 | 1.9 | 93.5 | 107.8 | 71 | 0.349 | 0.359 | 0.147 | 0.16 | 0.065 | 0.07 |
| EX2 | 0.4% LE4481 (MB50) | 6.4 | 51 | 3.6 | 88.1 | 78 | 62 | 0.343 | 0.366 | 0.137 | 0.158 | 0.075 | 0.074 |
| EX3 | 0.2% LE4481 (MB25) | 6.6 | 52 | 1.2 | 97.4 | 126.2 | 75 | 0.275 | 0.309 | 0.123 | 0.133 | 0.053 | 0.06 |
| Comparative Examples | | | | | | | | | | | | | |
| CE1 | 0.2% LDPE (MB25) | 6.6 | 50 | 0.4 | 99.6 | 130 | 113 | 5.23 | 3.396 | 3.265 | 3.046 | 3.444 | 2.985 |
| CE2 | 0.2% silica | 6.7 | 51 | 2.2 | 95.8 | 121.5 | 62 | 0.357 | 0.372 | 0.177 | 0.184 | 0.094 | 0.092 |

It can clearly be seen from these results that films produced by incorporating the polyolefin (B) according to the present invention comprising hydrolysable silicon groups which are cross-linkable, a new and superior antiblocking agent for polyolefin films may be provided which is excellent in antiblocking activity, scratch resistance and optical properties (including low gloss, low haze and high clarity) and exhibits at the same time a low coefficient of friction.

The invention claimed is:

1. A polyolefin composition comprising:
   i. an olefin homo- or copolymer (A) in an amount of 90 wt. % or more, and
   ii. an olefin homo- or copolymer (B) comprising hydrolysable silicon-containing groups,
   wherein olefin homo- or copolymer (B) is present in the composition in an amount of from 0.01 to 2 wt. %,
   and wherein the composition further comprises a silanol condensation catalyst.

2. The polyolefin composition according to claim 1, wherein the silanol condensation catalyst is selected from the group consisting of sulfonic acids, alkanoic acids, carboxylic acids, organic titanates and complexes or carboxylates of lead, cobalt, iron, nickel, zinc and tin or a precursor thereof.

3. The polyolefin composition according to claim 1, wherein the olefin homo- or copolymer (A) is an ethylene or propylene homo- or copolymer.

4. The polyolefin composition according to claim 1, wherein the olefin homo- or copolymer (B) is an ethylene homo- or copolymer.

5. The polyolefin composition according to claim 1, which is produced by a process comprising the steps of:
   i. blending in a first step olefin homo- or copolymer (B), in the presence of 2 to 20 wt. % of the silanol condensation catalyst with olefin homo- or copolymer (A) to obtain a master mixture,
   ii. cross-linking the master mixture in the presence of humidity to a cross-linking degree of 30% of the olefin homo- or copolymer (B), and
   mixing the cross-linked master mixture with olefin homo- or copolymer (A) to obtain the final concentration of the olefin homo or copolymer (A) in the polyolefin composition.

6. The polyolefin composition according to claim 1, which is produced by a process comprising the steps of:
   i. blending 0.01 to 2 wt. % of olefin homo- or copolymer (B), in the presence of 2 to 20 wt. % of the silanol condensation catalyst with olefin homo- or copolymer (A) to obtain a final mixture,
   ii. cross-linking the final mixture in the presence of humidity to a cross-linking degree of 30% of the olefin homo- or copolymer (B).

7. The polyolefin composition according to claim 1, wherein the olefin homo- or copolymer (B) is used in an amount of from 0.05 to 1 wt. %.

8. The polyolefin composition according to claim 7, wherein the olefin homo- or copolymer (B) is used in an amount of from 0.1 to 0.5 wt. %.

9. The polyolefin composition according to claim 1, wherein the amount of the silicon groups is from 0.1 to about 50 wt %, based on the total olefin homo- or copolymer (B).

10. The polyolefin composition according to claim 1, wherein olefin homo- or copolymer (B) is silicon-grafted and has a density of 920 to 960 kg/m3.

11. The polyolefin composition according to claim 1, wherein olefin homo- or copolymer (B) is obtained by a polymerisation of olefin monomers and silicon group-containing monomers and has a density of 900 to 940 kg/m3.

12. The polyolefin composition according to claim 1, wherein the olefin homo- or copolymer (B) comprises dispersed cross-linked particles.

13. The polyolefin composition according to claim 1, having a blocking force at 90° C. after 2 h of not more than 100 N, or not more than 80 N, as measured according to DIN 53366.

14. The polyolefin composition according to claim 1, having a static coefficient of friction of not more than 0.5 and/or a dynamic coefficient of friction of not more than 1, measured according to ISO 8295 at +23° C.

15. A film comprising a polyolefin composition according to claim 1.

16. A film comprising a hydrolysable silicon-group containing olefin homo- or copolymer (B) capable of being cross-linked in the presence of moisture, in an amount of from 0.01 to 2 wt. %.

* * * * *